United States Patent
Liou et al.

(10) Patent No.: US 7,443,931 B2
(45) Date of Patent: Oct. 28, 2008

(54) APPARATUS AND METHOD FOR CHANNEL ESTIMATION USING A SIGNAL CORRELATION AND A SIGNAL ENERGY TO APPROXIMATE A CHANNEL PARAMETER

(75) Inventors: Ming-Luen Liou, Zhonghe (TW); Chiao-Chih Chang, Taipei (TW)

(73) Assignee: Mediatek Incorporation, Hsin-Chu (TW)

( * ) Notice: Subject to any disclaimer, the term of this patent is extended or adjusted under 35 U.S.C. 154(b) by 602 days.

(21) Appl. No.: 11/107,467

(22) Filed: Apr. 15, 2005

(65) Prior Publication Data

US 2005/0232379 A1    Oct. 20, 2005

Related U.S. Application Data

(60) Provisional application No. 60/562,484, filed on Apr. 15, 2004.

(51) Int. Cl.
*H04B 1/66* (2006.01)

(52) U.S. Cl. ....................... 375/340; 375/229

(58) Field of Classification Search ........... None
See application file for complete search history.

(56) References Cited

U.S. PATENT DOCUMENTS

| | | | | | |
|---|---|---|---|---|---|
| 4,356,553 | A | * | 10/1982 | Steinle et al. | 702/60 |
| 5,272,727 | A | * | 12/1993 | Okanoue | 375/341 |
| 5,513,221 | A | * | 4/1996 | Parr et al. | 375/344 |
| 2003/0046064 | A1 | * | 3/2003 | Moriya et al. | 704/201 |
| 2004/0100898 | A1 | * | 5/2004 | Anim-Appiah et al. | 370/210 |

* cited by examiner

*Primary Examiner*—Shuwang Liu
*Assistant Examiner*—Gina McKie
(74) *Attorney, Agent, or Firm*—Thomas, Kayden, Horstemeyer & Risley

(57) ABSTRACT

In a channel estimation method, an input signal is received. The input signal is then sliced to obtain a sliced signal. The multiplication of the input signal and the $i^{th}$ delayed sliced signal are accumulated to obtain a cross-correlation value. The energy of the sliced signal is measured. The $i^{th}$ channel parameter of a channel response is estimated according to the division of the cross-correlation value by the energy of the sliced signal. A channel estimator performing channel estimation is also provided.

5 Claims, 2 Drawing Sheets

APPARATUS AND METHOD FOR CHANNEL ESTIMATION USING A SIGNAL CORRELATION AND A SIGNAL ENERGY TO APPROXIMATE A CHANNEL PARAMETER

This application claims the benefit of a provisional U.S. application, U.S. Ser. No. 60/562,484 filed Apr. 15, 2004.

BACKGROUND

The invention relates to a channel estimation method, and in particular, to an apparatus and method for approximating the channel response in a telecommunication system.

In telecommunication systems, the characteristics of the transmission channel can be represented by a channel response $h[n]=[h_0, h_1, \ldots, h_N]$. As is well known in the art, the channel estimation is an important task for a receiver. Traditionally, channel estimators are divided into two categories: data aided and non-data aided (blind) estimators. Data aided channel estimators operate on a pre-specified set of transmitted symbols that are known to the receiver. These symbols do not convey any information and are often called "pilot symbols" or "training sequences". Data aided channel estimators are typically simple to implement and relatively robust. Their major disadvantage is that they lead to an overall reduction in system throughput, since some of the transmitted symbols (the pilot symbols) do not carry any information.

Non data aided channel estimators, on the other hand, do not reduce the system throughput. However, they are typically quite complicated to implement as they are often based on higher order statistics of the received signal, and they most often suffer from high statistical variability, i.e. they suffer from large estimation errors. Generally, the accuracy of the channel estimation is important for correctly receiving, decoding the received signal. However, in some cases the required accuracy of the channel estimation is not so high. For example, the equalizer in the receiver may just want to roughly know the location and the strength of each echo in a multipath channel so that the initial step size for each equalizer coefficient for performing the adaptive algorithm can be determined accordingly. Therefore, it is desired that the channel estimation mechanism can somehow be simplified to reduce the implementation cost.

SUMMARY

An embodiment of the invention provides a channel estimation method. First, an input signal is received. The input signal is then sliced to obtain a sliced signal. A first value is obtained by accumulating the multiplication of the input signal and an $i^{th}$ delayed sliced signal, where i is an integer. A second value is generated and output by measuring the energy of the of the sliced signal. The $i^{th}$ channel parameter of a channel response is approximated according to the first and second values. The $i^{th}$ channel parameter may be estimated according to the division of the first value by the second value.

Another embodiment of the invention provides a channel estimator for estimating a transmission channel response represented by a plurality of channel parameters. The channel estimator comprises a slice, a delay line, an energy meter and a plurality of estimating units. The slicer receives an input signal and slicing the input signal to obtain a sliced signal. The delay line comprises a plurality of delay units for receiving the sliced signal and generating a plurality of delayed signals. The energy meter measures the energy of the sliced signal. The plurality of estimating units, each coupled to a respective delay unit, estimates a corresponding channel parameter according to the input signal, the output signal of the delay unit, and the measured energy of the sliced signal.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE INVENTION

Figure 1:
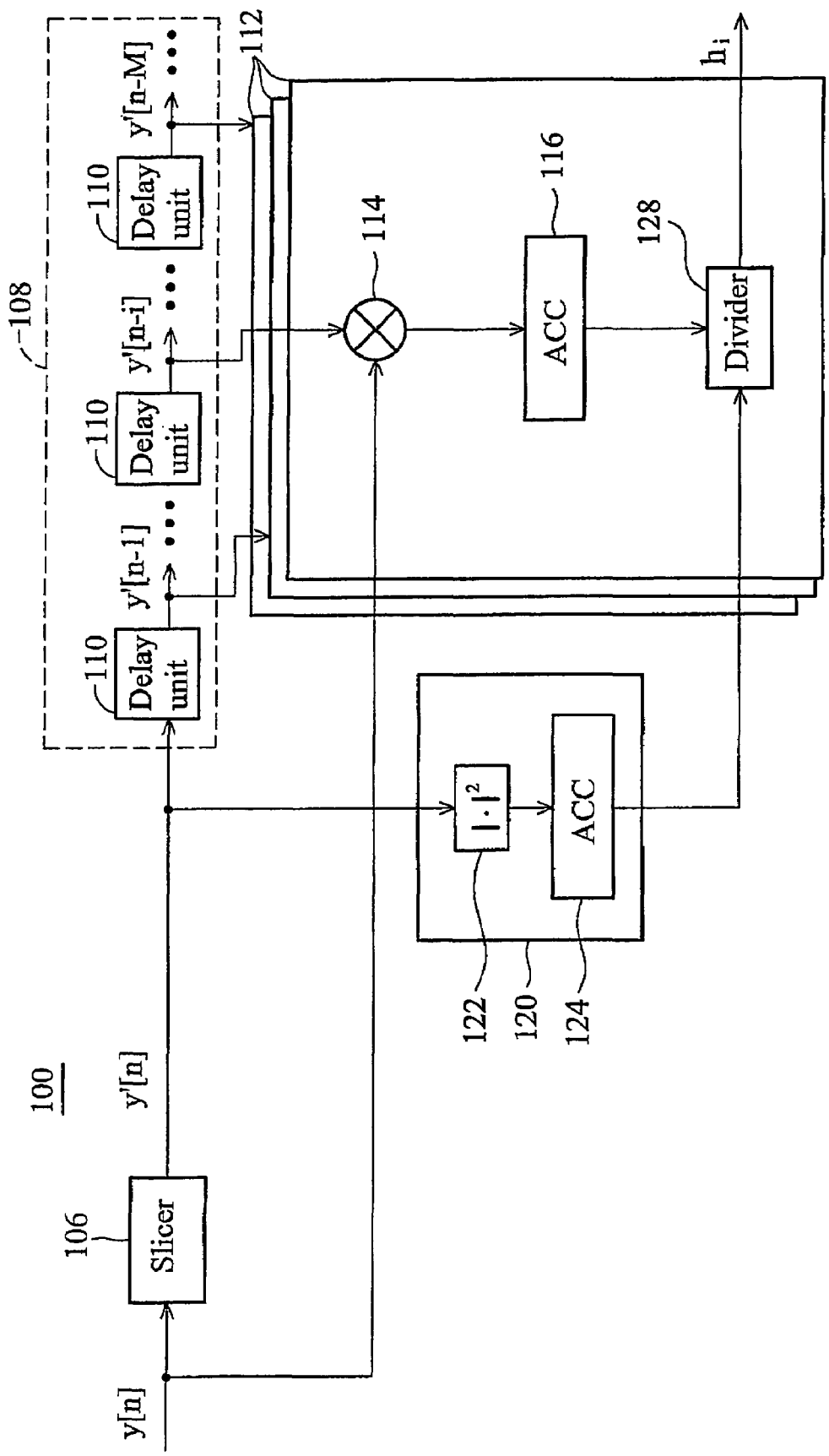
FIG. 1 shows an embodiment of the channel estimator according to the invention.

For simplicity, a simplified telecommunication system, wherein only the channel effect is taken into account is considered for describing the invention. However, as can be understood by a person skilled in the art, the present invention can be applied to a general telecommunication system.

In a simplified telecommunication systems, a transmitted signal $x_0[n]$ is affected by the transmission channel whose characteristics are modeled by a channel response $h[n]$. The input signal $y[n]$ received at the receiver side is given by:

$$y[n] = x_0[n] \otimes h[n] = \sum_{k=0}^{K} x_0[n-k] \cdot h_k \quad (1)$$

where $h[n]=[h_0, h_1, \ldots, h_K]$ denotes the channel response, and K is an positive integer.

In order to extract the transmitted signal $x_0[n]$ from the input signal $y[n]$, the input signal $y[n]$ is sliced to obtain a sliced signal $y'[n]$. The term "slice" refers to the process of taking the allowed symbol value that is nearest to that of the input signal $y(n)$. The sliced signal $y'[n]$ can be modeled as $$y'[n]=x_0[n]+e[n] \quad (2)$$

where $e[n]$ denotes an error term caused by channel impairment.

By substituting Equations (1) and (2) into a cross-correlation term $E(y'[n-i] \cdot y[n])$, we have $$E(y'[n-i] \cdot y[n]) = E((x_0[n-i] + e[n-i]) \cdot y[n]) \quad (3)$$

$$= E\left(x_0[n-i]\sum_{k=0}^{K} x_0[n-k] \cdot h_k\right) +$$

$$E\left(e[n-i]\sum_{k=0}^{K} x_0[n-k] \cdot h_k\right)$$

$$= \sum_{k=0}^{K} E(x_0[n-i]x_0[n-k]) \cdot h_k +$$

$$\sum_{k=0}^{K} E(e[n-i]x_0[n-k]) \cdot h_k$$

Assume that the error term $e[n]$ is a zero mean random process, the transmitted signal $x_0[n]$ is a wide sense stationary random process with zero mean and e[n] is uncorrelated with $x_0[n]$, thus we have $$E(x_0[n-i]x_0[n-k]) = \begin{cases} E(x_0^2[n]), & i=k \\ 0, & \text{otherwise} \end{cases} \quad (4)$$

$$E(e[n-i]x_0[n-k]) = 0, \quad \forall i,k \quad (5)$$

From Equations (4) and (5), the Equation (3) becomes $$E(y'[n-i]y[n]) = E(|x_0[n]|^2) \cdot h_i \quad (6)$$

Therefore, the $i^{th}$ channel parameter $h^i$ in the channel response h[n] can be estimated by $$h_i \approx \frac{E(y'[n-i] \cdot y[n])}{E(|x_0[n]|^2)} \quad (7)$$

Moreover, since the error term e[n] has been assumed to be a zero mean random process and uncorrelated with $x_0[n]$, the power of the y'[n] and the power of the $x_0[n]$ will have the following relationship, $$E(|y'[n]|^2) = E(|x_0[n] + e[n]|^2) = E(|x_0[n]|^2) + E(|e[n]|^2) \quad (8)$$

If the error term e[n] is small enough such that its power $E(|e[n]|^2)$ can be ignored, then the power of the $x_0[n]$ can be approximated by the power of the y'[n], i.e., $$E(|x_0[n]|^2) \approx E(|y'[n]|^2) \quad (9)$$

Substituting Equation (9) into (7), the $i^{th}$ channel parameter $h_i$ can thus be approximated by $$h_i \approx \frac{E(y'[n-i] \cdot y[n])}{E(|y'[n]|^2)} \quad (10)$$

FIG. 1 shows an embodiment of the channel estimator according to the invention. The channel estimator 100 comprises a slicer 106, a delay line 108, an energy meter 204, and a plurality of estimating units 112. The slicer 106 receives the input signal y[n], and slices the input signal y[n] to obtain a sliced signal y'[n]. The energy meter 120 comprises a power meter 122 and a first accumulator 124. The power meter 122 measures the power of the sliced signal y'[n]. The first accumulator 124 is used to accumulate the measured power of the sliced signal y'[n] to obtain the energy of the sliced signal y'[n].

The delay line 108 comprises a plurality of delay units 110 for generating delayed signals y'[n−1] to y'[n−M] based on the sliced signal y'[n] where M denotes the number of delay units. Each estimating unit 112, e.g. an $i^{th}$ estimating unit 112 comprising an multiplier 114, a second accumulator 116 and a divider 128. The multiplier 114 multiplies the input signal y[n] and a delayed signal y[n−i] output by the $i^{th}$ delay unit 110 to generate a multiplication result. The second accumulator 116 accumulates the multiplication result. The divider 128 is used for dividing the output of the second accumulator 116 by the output of the first accumulator 124 to obtain the estimate of the $i^{th}$ channel parameter $h_i$ of the channel response h[n]. In other word, the $i^{th}$ channel parameter $h_i$ in the channel response h[n] is estimated by $$h_i \approx \frac{\sum_{n=1}^{N} y'[n-i] \cdot y[n]}{\sum_{n=1}^{N} |y'[n]|^2}, \quad i = 0, 1, 2\Lambda, K \quad (11)$$

where N corresponds to the accumulation period. As well known, the accuracy of the estimation given in (11) can be increased by increasing the number of N.

Figure 2:
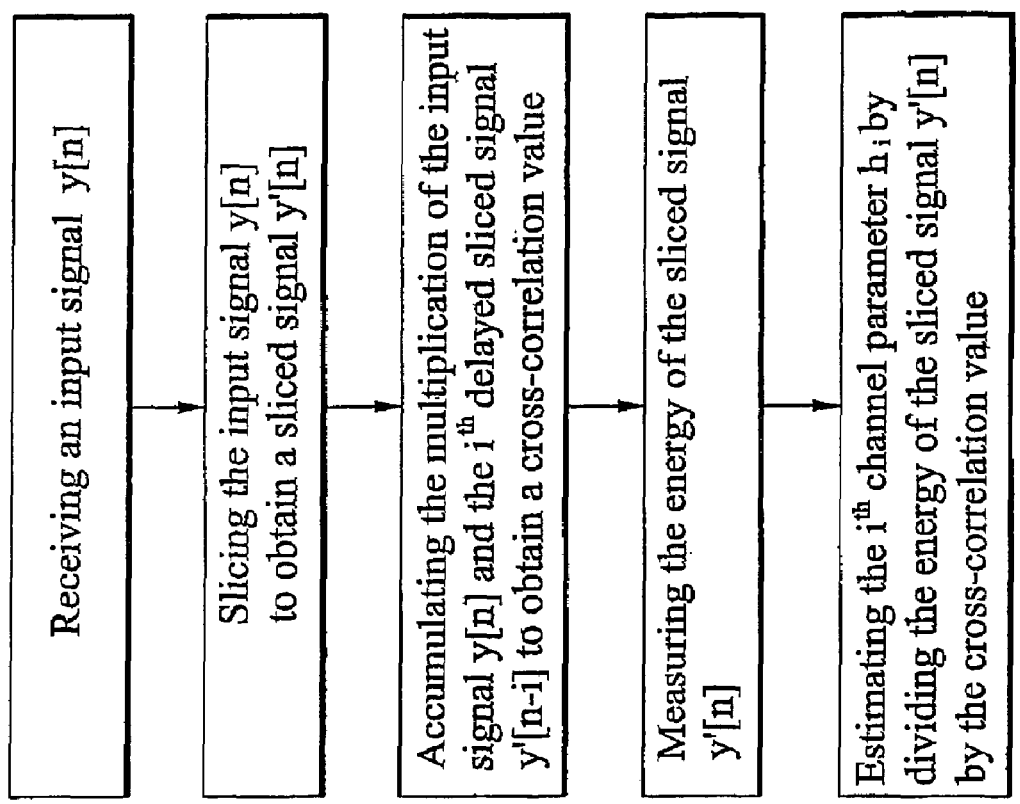
FIG. 2 is a flowchart of the channel estimation method according to an embodiment of the invention.

FIG. 2 is a flowchart of the channel estimation method according to an embodiment of the invention. In step 202, an input signal y[n] is received. In step 204, the input signal y[n] is sliced to obtain a sliced signal y'[n]. In step 206, the multiplication of the input signal y[n] and the $i^{th}$ delayed version, y'[n−i], of the sliced signal y'[n] are accumulated to obtain a cross-correlation value, $$\sum_{n=1}^{N} y'[n-i] y[n].$$

In step 208, the energy of the sliced signal y'[n] is measured by accumulating its power, i.e.

$$\sum_{n=1}^{N} |y'[n]|^2.$$

In step 210, the $i^{th}$ channel parameter $h_i$ of the channel response h[n] is approximated by dividing the energy of the sliced signal y'[n] by the cross-correlation value, according to Equation (11).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A channel estimation method, comprising:
   receiving an input signal; slicing the input signal to obtain a sliced signal;
   accumulating a multiplication of the input signal and an $i^{th}$ delayed sliced signal to obtain a first value, where i is an integer;
   measuring an energy of the sliced signal and outputting a second value; and
   approximating an $i^{th}$ channel parameter of a channel response according to the first and second values.

2. The channel estimation method as claimed in claim 1, wherein the $i^{th}$ channel parameter is estimated according to a division of the first value by the second value.

3. A channel estimator for estimating a transmission channel response represented by a plurality of channel parameters, comprising:
   a slicer, receiving an input signal and slicing the input signal to obtain a sliced signal;

a delay line, comprising a plurality of delay units, for receiving the sliced signal and generating a plurality of delayed signals;

an energy meter for measuring an energy of the sliced signal; and a plurality of estimating units, each coupling to a respective delay unit, for estimating a corresponding channel parameter according to the input signal, the output signal of the respective delay unit, and the measured energy of the sliced signal.

4. The channel estimator as claimed in claim 3, wherein the estimating unit comprises:

a multiplier, multiplying the input signal and the output signal of the respective delay unit to generate a multiplication result;

a first accumulator, accumulating the multiplication result to generate a first value;

a divider, dividing the first value by the measured energy of the sliced signal to obtain the corresponding channel parameter.

5. The channel estimator as claimed in claim 3, wherein the energy meter comprises:

a power meter for measuring a power of the sliced signal; and a second accumulator for accumulating the measured power of the sliced signal to generate the measured energy of the sliced signal.

* * * * *